United States Patent [19]
Prasanna

[11] Patent Number: 5,742,821
[45] Date of Patent: Apr. 21, 1998

[54] MULTIPROCESSOR SCHEDULING AND EXECUTION

[75] Inventor: G.N. Srinivasa Prasanna, Clinton, N.J.

[73] Assignee: Lucent Technologies Inc., Murray Hill, N.J.

[21] Appl. No.: 555,051

[22] Filed: Nov. 8, 1995

[51] Int. Cl.⁶ ...................................................... G06F 9/00
[52] U.S. Cl. ............................................ 395/672; 395/674
[58] Field of Search ............................. 395/672, 674, 395/675

[56] References Cited

U.S. PATENT DOCUMENTS

| | | | |
|---|---|---|---|
| 5,202,975 | 4/1993 | Rasbold et al. | 395/500 |
| 5,317,734 | 5/1994 | Gupta | 395/650 |
| 5,423,040 | 6/1995 | Epstein et al. | 395/650 |
| 5,537,580 | 7/1996 | Giomi et al. | 395/500 |

OTHER PUBLICATIONS

G.N.S. Prasanna et al., "Generalized Multiprocessor Scheduling Using Optimal Control"; Third Annual ACM Symposium on Parallel Algorithms and Architectures, pp. 216–228, Jul. 1991.

G.N.S. Prasanna et al., "Hierarchical Compilation of Macro Dataflow Graphs for Multiprocessors with Local Memory"; IEEE TPDS, Jul. 1994.

A. Agarwal et al., "The MIT Alewife Machine: A Large Scale Distributed–Memory Multiprocessor; Workshop on Scalable Shared Memory Multiprocessors"; Kluwer Academic Publishers, 1991; MIT/LCS Memo TM–454, 1991.

S. Ramaswamy et al., "A Convex Programming Approach for Exploiting Data and Functional Parallelism on Distributed Memory Multicomputers", Proceedings of the International Conference on Parallel Processing, Sep. 1994.

G.N.S. Prasanna, et al., IEEE Computer Society and ACM, SUPERCOMPUTING '94 PROCEEDINGS, "Generalized Multiprocessor Scheduling for Directed Acylic Graphs" pp. 237–246, Nov. 14–18, 1994.

Primary Examiner—Lucien U. Toplu

[57] ABSTRACT

In accordance with the principles of the invention, a multiprocessor scheduling and execution system and method is disclosed for signal processing tasks on P processors using a computer to schedule the execution. The method comprises representing the signal processing tasks in a manner stored within the computer so as to determine flow equations and timing constraints for the processor scheduling, performing corrected gradient descents on the stored representation of the signal processing tasks using the determined timing constraints and an error criterion until substantial convergence to a processor schedule occurs, and executing the signal processing tasks on the P processors substantially in accordance with the processor schedule.

17 Claims, 7 Drawing Sheets

MULTIPROCESSOR SCHEDULING AND EXECUTION

BACKGROUND OF THE INVENTION

1. Field of the Invention

This invention relates to multiprocessors, and more particularly, to multiprocessor scheduling and execution.

2. Description of the Related Art

Many multiprocessor scheduling problems may be characterized as a set of tasks, also called nodes or macro nodes in a graph, associated precedence constraints, a finite pool of processor resources, and specified speedup functions for each task as a function of applied processing power. The classical multiprocessor scheduling problem is to specify work for each processor over time such that the entire set of tasks is computed in a relatively short time, satisfying the precedence constraints, and using only the available processor resources. An important subclass of multiprocessor scheduling includes parallelism in tasks.

Typically, any number of processors may be applied to each task at any time, and the higher the parallel processing power applied to the task, the faster it can execute, therefore increasing its speedup. However, because of scheduling, synchronization and communication overhead, the speedup is typically less than linear. The problem is then to specify both the number of processors applied to a task as well as the sequencing of tasks.

In the prior art, optimal control theory has been applied to tackle this problem. In the special case where the speedup function of each task is modeled as $p^\alpha$, where p is the amount of processing power applied to the task, a closed form solution for task graphs formed from parallel and series connections has been derived, using divide and conquer techniques. For example, see S. Prassana et al., "Generalized Multiprocessor Scheduling Using Optimal Control", Third Annual ACM Symposium on Parallel Algorithms and Architectures, p. 216–228, July 1991, herein incorporated by reference.

Multiprocessor scheduling results have considerable practical significance. For example, it arises in the compilation of matrix arithmetic, which forms the kernel of much signal processing. Expressions composed of matrix additions, dot products, matrix multiplies, and inverses commonly dominate the runtimes of these operations.

More specifically, matrix operators may be systematically decomposed into parallel operations. For example, an N×N matrix product may be decomposed into $N^2$ dot products, $N^3$ scalar multiplies and additions, etc. As more processors are applied to compute a matrix operator, its execution time decreases, but less than linearly typically because of overhead, as previously indicated. Compilation of matrix arithmetic therefore involves partitioning each matrix operator into a number of pieces, assigning a processor to each piece, and scheduling the pieces.

Figure 1:
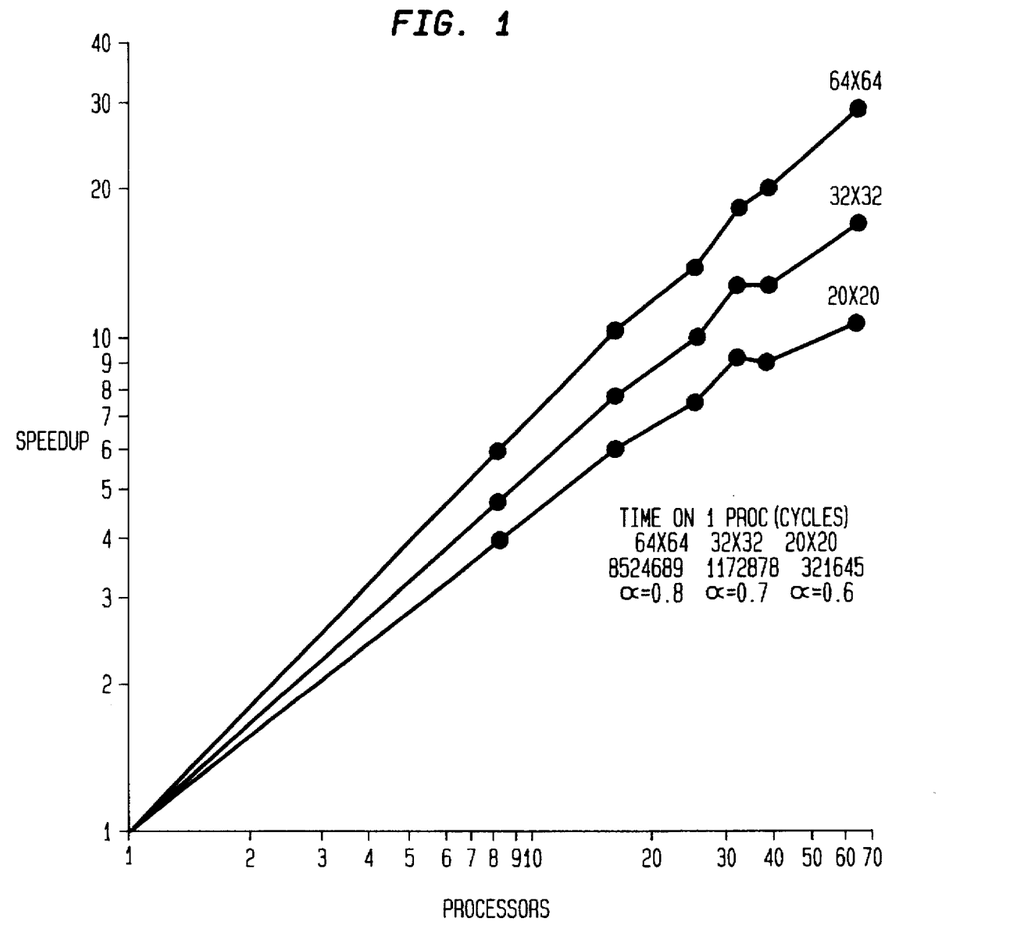
FIG. 1 is a graph of speedup curves for a variety of matrix products.

Speedup functions of several matrix operations have been measured on the MIT Alewife distributed-shared memory multiprocessor. For example, FIG. 1 shows a log-log plot of the speedup curves, for a matrix multiplication, for various matrix sizes. Functions of the form $p^\alpha$ will appear as straight lines on a log-log plot, whose slope is the desired parameter $\alpha$. The curves illustrated are roughly straight lines, indicating that these functions may be well approximated by $p^\alpha$. The slopes ($\alpha$'s), however, depend on the size of the matrices, and range from 0.6 (for 20×20 matrices) to 0.8 (for 64×64 matrices). An average value of $\alpha=0.7$ may be used for the matrix sizes above.

Other proposed techniques include partitioning and scheduling program dataflow graphs for execution on multiprocessors. For example, see Ramaswamy et at. "A Convex Programming Approach for Exploiting Data and Functional Parallelism on Distributed Memory Multicomputers" in Proceedings of the International Conference on Parallel Processing, September 1994, herein incorporated by reference. Generalized scheduling problems are also known in the art. General purpose graph partitioning and classical scheduling algorithms are applied to graphs derived from the original task graph by appropriate task expansion. These techniques work in a different manner when applied to directed acyclic graphs, and typically, many important tasks, such as particular types of signal processing, are formulated as a directed acyclic graph. DAGs, in general, cannot be reduced to single nodes using series-parallel tree reductions. Thus, a need exists for a method of scheduling the execution of multiprocessors when applied to tasks formulated in a directed acyclic graph structure.

SUMMARY OF THE INVENTION

In accordance with the principles of the invention, a multiprocessor scheduling and execution system and method is disclosed for signal processing tasks on P processors using a computer to schedule the execution. The method comprises representing the signal processing tasks in a manner stored within the computer so as to determine flow conservation equations and timing constraints for the processor scheduling, performing corrected gradient descents on the stored representation of the signal processing tasks using the determined flow conservation equations and timing constraints and an error criterion until substantial convergence to a processor schedule occurs, and executing the signal processing tasks on the P processors substantially in accordance with the processor schedule.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof, may be best understood by reference to the following detailed description when read with the accompanying drawings in which:

DETAILED DESCRIPTION

Starting with a directed acyclic graph (DAG) of tasks, each task starts at state 0, and ends with its state advanced to completion. Tasks which are aggregations of atomic nodes, or macro nodes, commonly encountered in matrix arithmetic, are well characterized by prior art models as further described in Prassana et al. above. The state at a time instant corresponds to the fraction of atomic nodes completed by that time instant. As more processors are applied, more atomic nodes are computed per unit time.

As the number of processors allocated to a task increase, overhead of various kinds, e.g. scheduling, communication, synchronization between the processors, typically increases. Thereby, the incremental speedup obtained keeps falling, which implies that the speedup functions of the task are convex. A convex speedup implies that processing efficiency decreases as the number of processors allocated to a task is increased. Hence, overall computation speed is still improved by running concurrently as many tasks as the available parallelism allows, using few processors for each task. In contrast, running the tasks one by one, using all the processors for each task, for example, is slower because of the overhead of breaking down the tasks to sub-tasks. Essentially, running many whole tasks in parallel improves the granularity of the threads produced from each task, thus reducing overhead.

As an example, let $\Omega = \{1, \ldots, N\}$ be a set of N tasks to be executed on a system with P processors, N and P being positive integers. These processors can be, for example, digital signal processors (DSPs), microprocessors within a single computer or multiple individual computers linked together over a network. Let task i have length $L_i$. That is, $L_i$ denotes the execution time of the task on a single processor. For a typical signal processing task, such as Strassen, for example, a set of precedence constraint may be specified, wherein task i should not start until after all its predecessors have finished because a given task may rely on the results of its predecessors. It is convenient to define the state $x_i(t)$ of task i at time t to be the amount of work done so far on the task. $0 \le x_i(t) < L_i$. Let $t_i$ be the earliest time at which all predecessors of i (if any) have finished, so that i can begin running. Thus $x_i(t)=0$ for $t<t_i$, and $x_j(t_i)=L_j$ for all of i's predecessor task j, if task i has no predecessors, $t_i=0$. The finishing time of task i is denoted by $t_i^F$.

Let $p_i(t)$ be the processing power, i.e. the number of processors or processor assignment, applied to task i at time t, and let P be the total processing power available, i.e., the total number of processors. The $p_i(t)$ are all non-negative, and must sum to at most P. Note that the $p_i(t)$'s are arbitrary continuous time varying functions, thus allowing arbitrary preemptive schedules. The assumption of continuity is necessary to apply the optimal control techniques. Typically, discrete processing powers are generally close to the continuous $p_i(t)$'s, and can be well approximated by discretizing the continuous $p_i(t)$'s. Unless otherwise specified, in this context, the $p_i(t)$'s are referred to as to be in the continuous domain.

Finally, once a task's predecessors have finished, the rate at which it proceeds, $dx_i(t)/dt$, depends in some nonlinear fashion on the amount of processor power applied, $p_i(t)$, but not on the state $x_i(t)$ of the task, nor explicitly on the time t. This is commonly called the assumption of space-time invariant dynamics and can be written:

$dx_i(t)/dt=0$ for $t<t_i$, $s_i(p_i(t))$ for $t>=t_i$ where $s_i(p_i(t))$ is referred to in this context as the speedup function. From this it is shown that $s_i(p)>0$ for $p>0$. Also, it is a non-decreasing function, since adding more processors should make the task execute faster. The goal is to finish all tasks in a reduced amount of time $t^F$, by allocating processor resources $p_i(t)$.

In the case of $s_i(p)=p^\alpha$, the processor assignment $p_i(t)$ for any task i does not vary during its computation, but is constant. Once the number of processors is assigned, changing this number will only cause an increase in processing time. This processor assignment will be denoted by $p_i$ itself for simplicity. A key result is that once a task is runnable, it is assigned a constant, non-zero processor power until it finishes, $p_i(t)=p_i>$ for all $t_i<t<t_i^F$. Otherwise, $p_i(t)=0$ for $t<t_i$ and $t>t_i^F$. This property shows that a processor schedule may be found by determining a set of constants, the $p_i$'s, instead of the processor assignment functions $p_i(t)$'s.

When task i finishes, either $t_i^F=t^F$ and the entire larger task, such as matrix multiplication, for example, is finished, or else the processing power originally allocated to task i is reallocated to those successors of task i which begin at the same time that task i ends. A processor schedule obtained in accordance with an embodiment of a method of scheduling and execution of multiprocessors in accordance with the invention satisfies this flow conservation property at each task in the graph. Also, the finishing times of all those predecessors of a task, which feed processing power to it, are the same. This timing constraint results in a set of loop equations which the improved schedule satisfies. A processor scheduler for any arbitrary number of processors P is found using P=1, and then scaling the resulting processor allocations by P. Using unity exploits the homogeneity of the $p^\alpha$ speed up function.

It follows from this that under $p^\alpha$ dynamics, processing power may be treated as if it were an electric charge and the precedence constraints as if they were wires. Tasks with no predecessors are initially allocated a given amount of processor "charge" and tasks with predecessors are given no initial processor power. The processing power allocated to an initial task does not change until the task finishes. At this time, the processor charge "flows" out of the task, into its successors. Not all successors of the task get this processor charge, only the ones which become enabled to run at this time because all of their predecessors are finishing. As these tasks finish, their processor power is released and "pours" into their enabled successors.

This "flow" continues until finally the tasks with no successors are all running and they all complete together, $t^F$. This flow and finishing time property results in a major reduction in the complexity of scheduling, and reduces the scheduling and execution problem over the space of all $p_i(t)$'s, to one determining a set of constant processor allocations $p_i$'s. These processor allocations in turn are substantially determined by the flow $p_{ij}$ of processing power along each edge from j to i.

Thus, a method of scheduling and executing multiprocessor tasks in accordance with the invention may be accomplished as follows. A set of flow conservation and loop equations can be derived as specified in detail below. Fast, polynomial time gradient based techniques may be employed to solve this system of equations in an embodiment of a method of scheduling and executing multiprocessor tasks in accordance with the invention. This particular embodiment should take $O(E^2+EN+I(N+E))$ time per iteration, where N is the number of nodes, E is the number of edges in the task graph, and I is a constant. In the discussion that follows, it is assumed that the task graph for the larger task to be scheduled and executed has one start node s and one final node f. The total number of processors is denoted by At each task i, the processing power $p_i$ allocated to those predecessors which finish when i starts, flows into i. These flow conservation equations are of the form $$N_i = \sum_{j \in \text{Pred}(i)} p_{ij} - \sum_{j \in \text{Succ}(i)} p_{ji} = 0, 1 \ldots N-2$$

at interior nodes, where Pred(i) and Succ(i) refer to those predecessors of node i which feed processing power to it, and those successors of node i to which node releases its processing power.
At the start task s, $$N_s = P - \sum_{j \in \text{Succ}(s)} p_{js} = 0$$

Finally, at the final task f, $$N_f = \sum_{j \in \text{Pred}(f)} p_{fj} - P = 0$$

As previously indicated, these equations are analogous to the Kirchoff's Current law (KCL) equations of electrical circuit theory. It is now seen that N−1 of these equations are linearly independent.

At each node, the finishing times of all predecessors which feed this node should match. This constraint is translated into a set of loop timing equations, in a manner analogous to the Kirchoff's voltage law of circuit theory. A breadth first search (BFS) spanning tree of the task graph may then be constructed by the master processor. This is the processor that starts and stops all the other processors. The E−N+1 fundamental loops resulting from this spanning tree may be employed to yield a necessary and sufficient set of timing equations. These equations are of the form $$LO_i = \sum_{j \in \text{Loop}_i} \pm t_{jr} = \Sigma \pm \frac{L_j}{p_j^\alpha} = 0, i = 1 \ldots (E-N+1),$$

where $p_j = \sum_{k \in \text{Pred}(j)} p_{jk}$ is the total processing power allocated to node j from its predecessors and $L_j$ is the length of task j. The notation $t_{jr} = t_j^F - t_j$ is introduced to refer to the total run time of task j (equal to $L_j/P_j^\alpha$). The sign (±) assigned to the coefficient refers to the direction in which the particular task is being traversed in the directed loop. The N−1 node flow conservation equations, together with the E−N+1 loop timing equations completely determine the E processor flows $p_{ij}$'s.

Figure 2A:
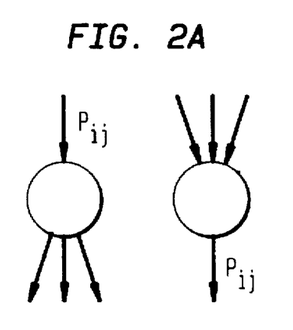
FIG. 2A is a plot illustrating essential flows to and from a task.

This illustrative description of the embodiment has been simplified to avoid a potential complication arising from the multiple edges available for flow from a task to its successors. Flow occurs only along certain edges, and may or may not occur on others. An edge is classified as flow-essential or non-flow-essential, depending on whether it may sustain a zero flow or not. In FIG. 2A, the task has either a single incoming edge, or a single outgoing edge. In either case, the flow $p_{ij}$ on that edge has to be non-zero, else the task either cannot get any processors to compute it, or cannot release its processors to successors after it is done.

Figure 2B:
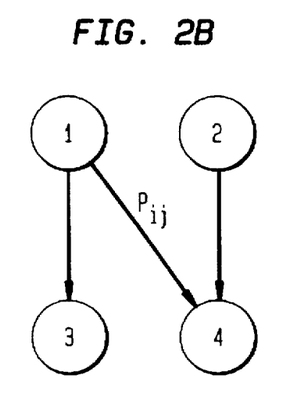
FIG. 2B is a plot illustrating non-essential flows between tasks.

In FIG. 2B, edge 1–4 between tasks 1 and 4 is non-flow-essential, since task 1 can release its processing power to task 3 after task 1 is completed, and task 4 can obtain its processing power from task 2 after task 2 is completed. If non-zero flow $p_{ij}$ does indeed occur along edge 1–4, nodes 1 and 2 will finish together, in accordance with the loop equations. If flow does not occur along edge 1–4, the precedence constraint will have node 1 finish no later than the start time of node 4. Thus, a non-flow-essential edge imposes a latest-finish-time constraint on its source node.

Figure 2C:
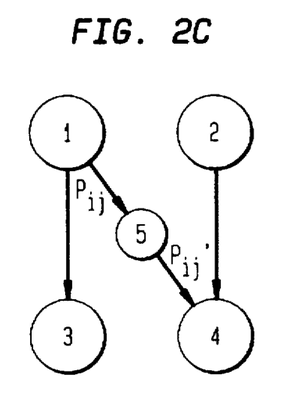
FIG. 2C is a plot illustrating node augmentation to convert $P_{ij}$ to an essential flow.

Latest-finish-time constraints cause the loop equations to become inequalities, complicating their solution. It is difficult to predict apriori which equations will be satisfied as equalities corresponding to non-zero flow on the corresponding non-flow-essential edge. To avoid this, a new dummy node may be inserted in each non-essential edge, with very small length $\epsilon$, yielding a new node-augmented graph, without non-essential flows (FIG. 2C). Node augmentation should not unduly increase the finish time or the size of the DAG. At most O(E) new nodes are created.

The E−N+1 loop equations are nonlinear in the processor flows $p'_{ij}$s. Typically, solving a coupled nonlinear system is very difficult in general, but the strict convexity and monotonicity of the speedup function $p^\alpha$ reduces the complexity, by facilitating gradient based techniques, as described in more detail hereinafter.

In the particular embodiment, the E−N+1 loop equations are solved simultaneously, using the sum of squares error criterion $$\text{ERR} = \sum_i LO_i^2, i = 1 \ldots (E-N+1)$$

although, of course, the scope of the invention is not limited in this respect. This has the gradient $$\nabla \text{ERR} = 2 \sum_i LO_i \nabla LO_i, i = 1 \ldots (E-N+1)$$

Note however, that the raw gradient cannot be used directly, since it in general violates the node equations. However, that component which lies inside the subspace spanned by the node equations may be used. Thus, a constrained gradient technique is used to solve the system of equations for $N_i$ and $LO_i$. Since there are E flows $p_{ij}$, an E-dimensional gradient is employed.

In an embodiment of the present invention, the first task comprises characterizing the multiprocessor scheduling and execution problem as a directed acyclic graph. The second task comprises removing transitive edges which have zero flow, and performing node-augmentation. Then, for the modified DAG, determining the node equations $N_i$ and loop equation $LO_i$ in time O(N+E+EN) in the manner previously described. A breadth first spanning tree (BFS tree) of the DAG may be constructed in the process of determining the loop equations. Then, an orthonormal basis ON may be determined for the set of node equations. The standard Gramm-Schmidt procedure takes time $O(EN^2)$. An initial flow may be determined wherein the total inflow at a task is distributed equally amongst all successors, taking time $O(E+N)$. Finally, the multiprocessors are executed in accordance with the improved schedule obtained. Again, as will now be appreciated by one of ordinary skill in the art, these steps may be implemented on a conventional general purpose computer or on a special purpose signal processor to schedule and execute signal processing, for example, on multiple processors.

In this particular embodiment, the gradient descent may begin by determining the gradient of the error criterion ERR(F) at the current flow vector F. This takes time $O(E^2)$, since there are $O(E-N+1) \approx O(E)$ gradients to be summed, each with E components. Although the raw gradient, in general, violates the flow conservation equations, the gradient may be corrected by removing any component not in the hyperspace spanned by the node equations $N_i$. The projection of the raw gradient on each basis vector in ON is summed, yielding the corrected gradient $\Delta$, and taking time $O(EN)$.

In the next step of this particular embodiment, the error ERR may be reduced along the corrected gradient, using standard 1-dimensional techniques, i.e., a constant k may be determined such that ERR(F+k$\Delta$) is reduced. At each iteration, the ERR may be efficiently calculated by computing the node finishing times along the BFS tree used to generate the loop equations, taking the differences in finishing time at the forward and reverse branches of each fundamental loop, squaring, and summing, taking time $O(N+E)$ overall. The derivative of ERR may also be calculated in a similar fashion.

This process should converge when all loop timing errors are adequately small, relative to the computed finishing time of the graph. The process hence takes time $O(I(N+E))$ in all, where I is the number of iterations used in the 1-D minimization, which may be bounded by a moderate constant. The overall time taken for each update of the flow vector F is then $O(E^2+EN+I(N+E))$ which is a low-order polynomial of the initial size of the task graph. As presented above, the minimization proceeds in the direction of the corrected gradient. Finally, once the processor schedule is obtained, then the processors may be executed in accordance with that schedule.

Figure 3A:
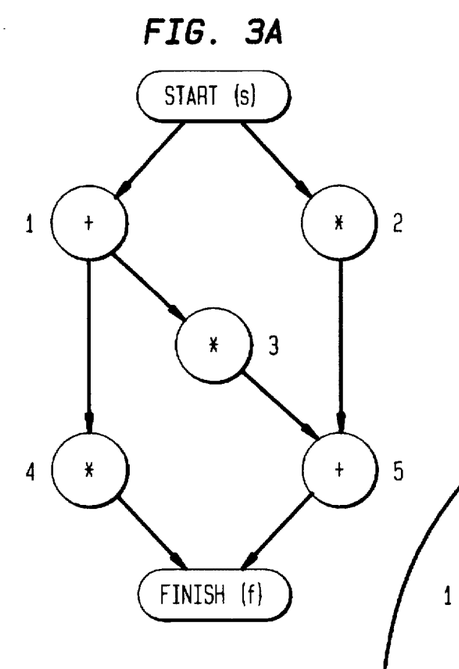
FIG. 3A is a plot illustrating a typical task formulated as a directed acyclic graph that may be scheduled for execution by multiprocessors in accordance with an embodiment of the invention.

As an example, consider the DAG in FIG. 3A. It has five nodes (three matrix multiplies and two additions). All of its 8 edges are flow-essential. Flow conservation at nodes s (start node), 1, 2, 3, 4, and 5 respectively implies the node equations below:

$$P_{1s} + P_{2s} = P; \quad P_{1s} - P_{31} - P_{41} = 0$$
$$P_{2s} + P_{52} = 0 \quad P_{31} - P_{53} = 0$$
$$P_{41} + P_{f4} = 0 \quad P_{52} + P_{53} - P_{f5} = 0$$

Figure 3B:
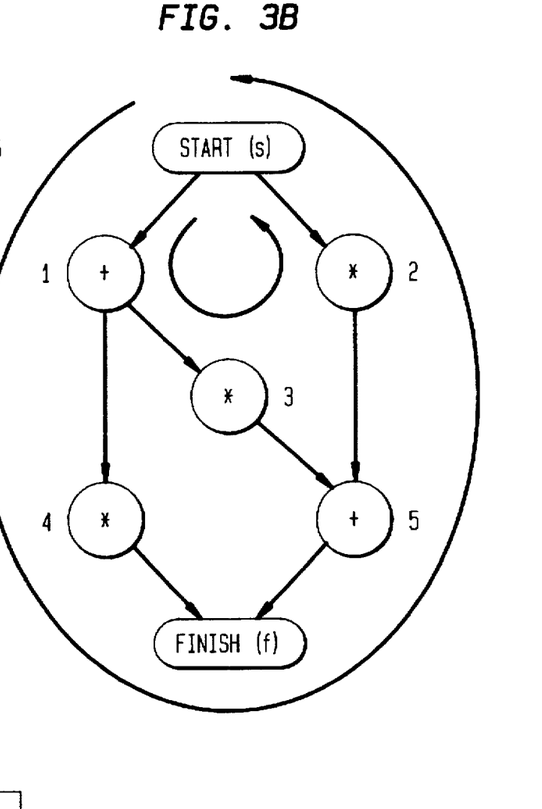
FIG. 3B shows two fundamental loops of FIG. 3A.

FIG. 3B shows a BFS tree, together with two fundamental loops, s13​52 and s14f52. The loop equation corresponding to s13​52 equalizes the finish times of nodes (tasks) 2 and 3. The loop equation corresponding to s14f52 equalizes the finish times of nodes 4 and 5. The respective loop equations are:

$$\frac{L_1}{p_{1s}^{\alpha}} + \frac{L_3}{p_{31}^{\alpha}} + \frac{L_2}{p_{2s}^{\alpha}} = 0$$

$$\frac{L_1}{p_{1s}^{\alpha}} + \frac{L_4}{p_{41}^{\alpha}} - \frac{L_2}{p_{2s}^{\alpha}} - \frac{L_5}{(p_{52}+p_{53})^{\alpha}} = 0$$

Figure 3C:
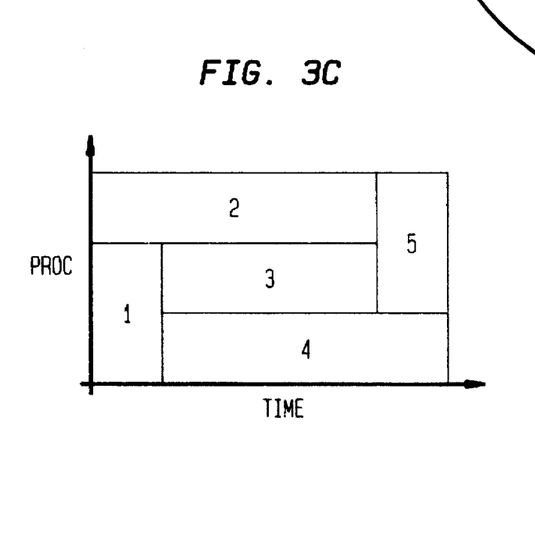
FIG. 3C is a Gant chart of an improved schedule that may be executed by multiprocessors in accordance with an embodiment of the present invention.

These equations determine the processor flows along the 8 edges and, hence, the processor schedule. This system is solved with the task size of an N×N×N matrix multiplication as $M=2N^3$ ($N^3$ multiplies and additions), and the task size of an N×N matrix addition as $N^2$ (only additions). 32×32 matrices and P=64 processors were used for this example. The resultant schedule, as shown in FIG. 3C, splits processors in such a way that the three matrix multiplications get approximately P/3=21 processors each. The computed finishing time is approximately 2.18 $M/P^{\alpha}$, where $M=2N^3$ is the time taken to perform a matrix multiplication on 1 processor.

Figure 4A:
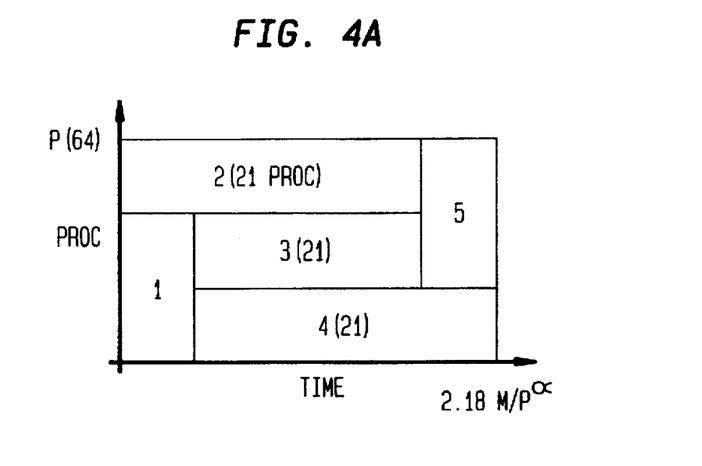
FIGS. 4A, 4B and 4C are graphs comparing the times versus processors needed between schedulized execution of multiprocessors in accordance with an embodiment of the present invention and that of Naive and Greedy approaches.
Figure 4B:
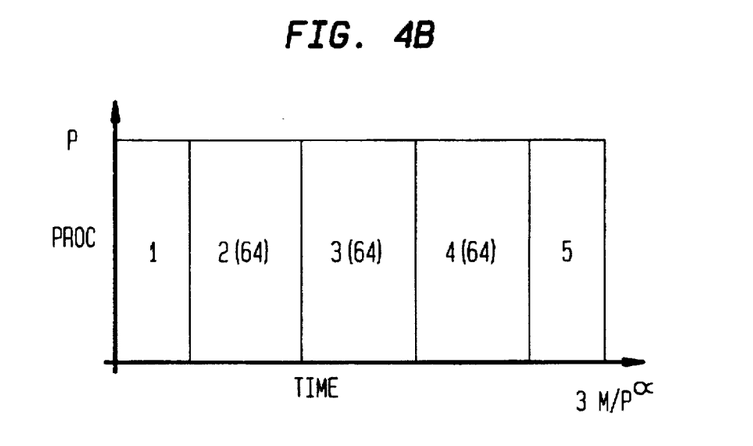
Figure 4C:
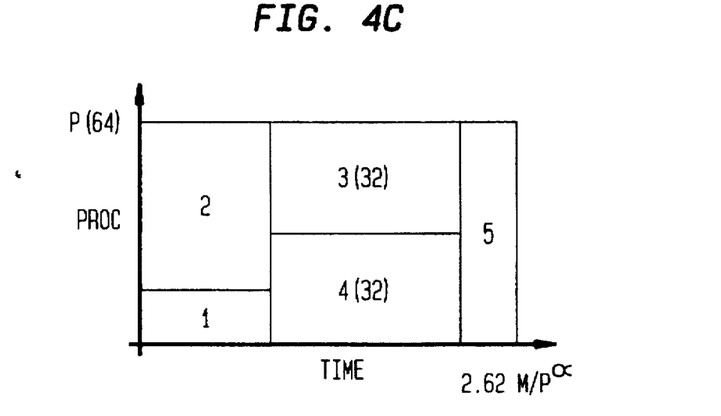

FIG. 4 compares the processor schedule for this example with those obtained using "Naive" and "Greedy" Heuristics. A Naive schedule in FIG. 4B runs all five tasks in sequence, assigning all P=64 processors to each. This incurs the maximum overhead, and is the slowest possible schedule, with a finishing time of about $3M/P^{\alpha}$. A Greedy schedule in FIG. 4C runs matrix multiply 2 in parallel with matrix addition 1. Processors are distributed between the two tasks in such a way that they finish together, the multiplication getting most of the processing power. Then multiplications 3 and 4 are run in parallel, each with P/2=32 processors. Then the final addition is computed. The resultant schedule is again sub-optimal, with a finishing time of approximately $2.62M/P^{\alpha}$, missing the opportunity to run all the three matrix products together. The processor schedule obtained in accordance with this particular embodiment, with a finishing time of 2.18 $M/P^{\alpha}$, is 38% faster than the Naive Heuristic, and 20% faster than the Greedy Heuristic.

Figure 5A:
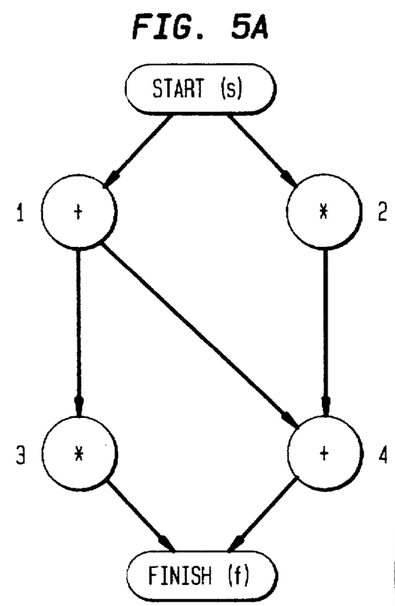
FIG. 5A illustrates another typical task formulated as a DAG with non-essential edge flows that may be scheduled for execution by multiprocessors in accordance with an embodiment of the present invention.
Figure 5B:
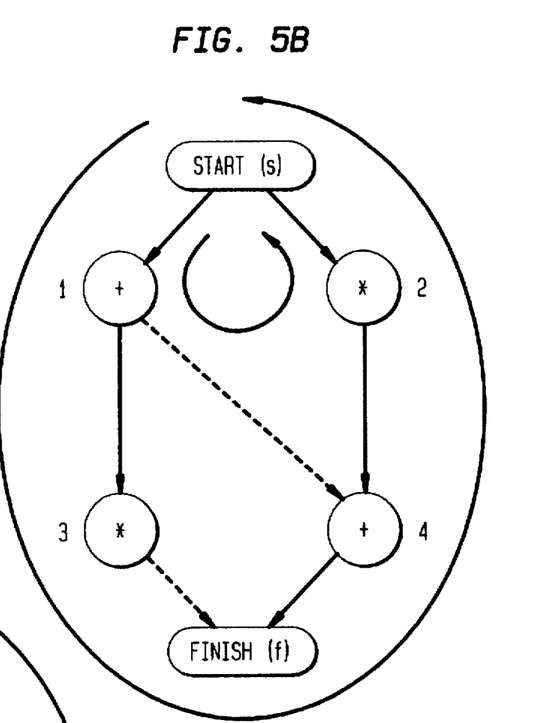
FIG. 5B shows the DAG of FIG. 5A with its fundamental loops before node augmentation.

Now considering the DAG in FIG. 5A as having four nodes (two multiplies and two additions). The edge between 1 and 4 is non-flow-essential. Assume a non-zero flow exists on edge 14. FIG. 5B shows a BFS tree, together with two fundamental loops, s142 and s13f42. The loop equation corresponding to s142 equalizes the finish times of nodes 1 and 2. The loop equation corresponding to s13f42 equalizes the finish times of nodes 3 and 4. These two constraints show that the tasks corresponding to nodes 1 and 2 may be executed in parallel, finishing simultaneously, and then tasks corresponding to nodes 3 and 4 may be executed in parallel. Since the multiplications are much larger than additions, the finishing time of the DAG is roughly the time taken to compute two multiplications, $2M/P^{\alpha}$. However, this is still sub-optimal, since if no flow occurs on edge 14, the two branches may be executed together in parallel, using $P^{\alpha}/2$ processors each, and improving efficiency. The run time is then $M/(P/2)^{\alpha}=2^{\alpha}M/P^{\alpha}$.

Figure 5C:
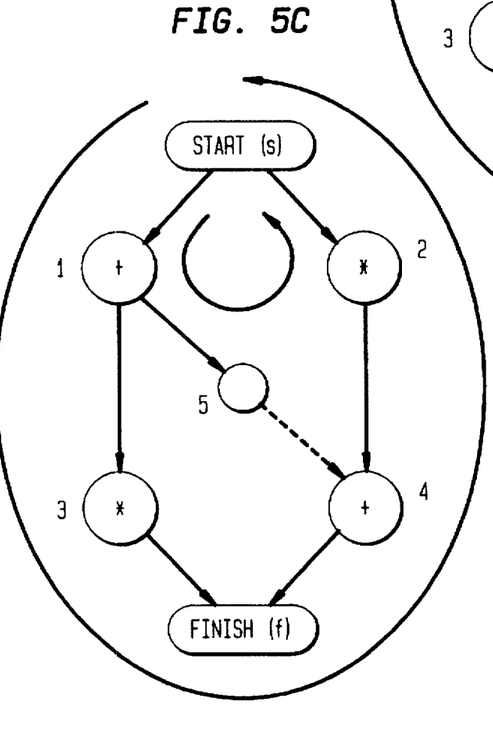
FIG. 5C shows the DAG of FIG. 5A with its fundamental loops after node augmentation in accordance with an embodiment of the present invention.

FIG. 5C shows how a node-augmentation schedule obtained in accordance with this particular embodiment of the present invention enables an improved processor schedule for execution to be obtained. A very small task, 5, is introduced in edge 14. Now task 1 is no longer constrained to finish together with task 2. It can finish sooner, allocating most of its processors to task 3, and assigning a small amount to task 5, to enable it to finish together with task 2. This effectively allows the two branches to be executed independently.

The tasks chosen in the following examples include DAGs explicitly synthesized to evaluate the method, as well as DAGs corresponding to frequently encountered matrix operations. All tasks correspond to matrix operations. Operation sizes are determined by a simple count of the number of adds, multiplies, etc. performed, i.e. an N×N matrix product has $N^3$ scalar adds and multiplies with scalar addition and multiplication taking approximately the same time. In these examples, the matrix size N was taken to be 32×32, which is a reasonable choice for dense matrix operations. The results from the processor flow are compared with those from the Naive and Greedy Heuristic.

In an embodiment of a method of scheduling and executing multiprocessors in accordance with the invention, several parameters may be chosen to ease the computation technique. For example, the homogeneity property of the $p^\alpha$ speedup function illustrates that for any arbitrary number of processors P, it is sufficient to let P=1, and then scale the resulting processor allocations by P. Next, the speedup parameter is taken to be $\alpha \approx 0.7$, based on measurements made on actual matrix multiplies of this size on the Alewife multiprocessor, although the invention is not limited in scope in this respect. Finally, the size of the dummy node used to perform node-augmentation may be taken to be 2.5% of the largest task in the graph. This is small enough not to unduly perturb the solution, yet large enough not to cause undue convergence difficulties. Widely varying task sizes may cause the system of loop equations to become ill-conditioned, causing convergence problems. To facilitate convergence and avoid ill-conditioning, the minimum task size is initially restricted to be 5% of the largest task. The solution obtained is used as a starting point for the next stage, where the minimum task size is halved. This procedure is continued until the smallest task size is allowed.

Figure 6A:
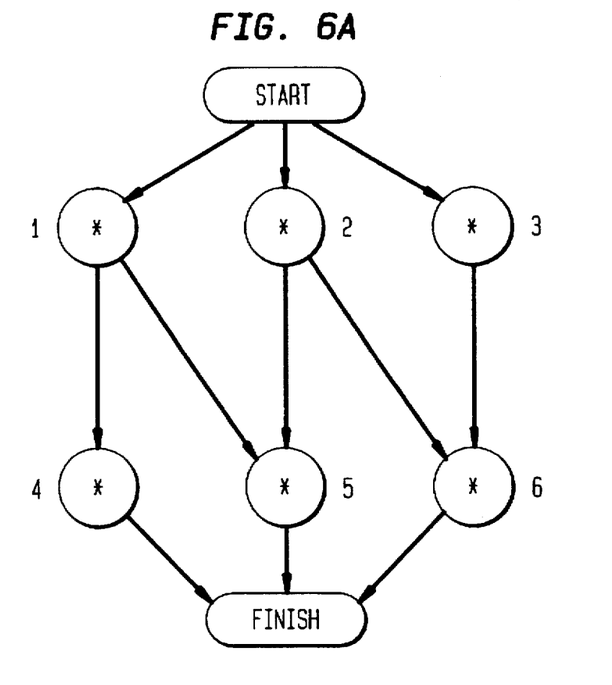
FIGS. 6A and 6B are examples of typical complex tasks formulated as DAGs that may be scheduled for execution by multiprocessors in accordance with an embodiment of the present invention.
Figure 6B:
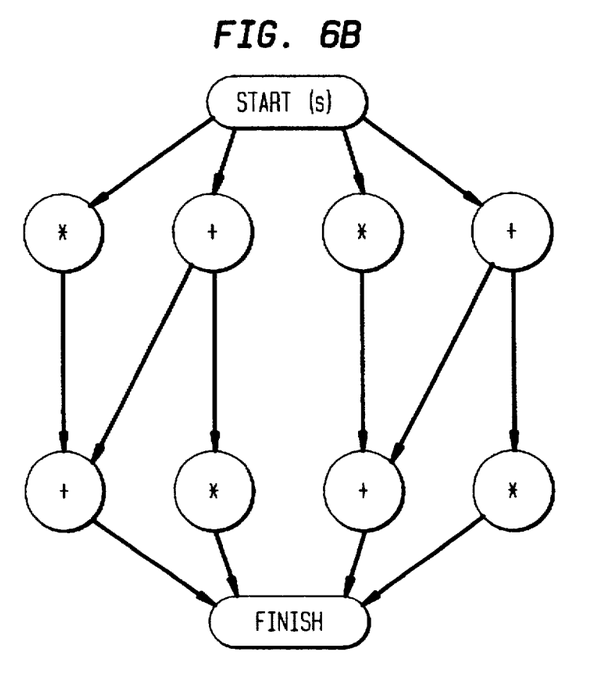
Figure 7A:
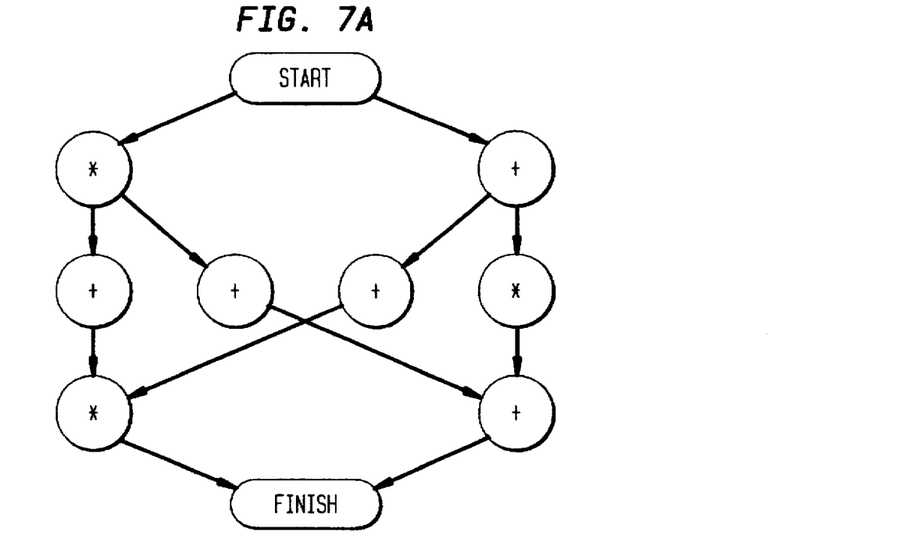
FIGS. 7A and 7B are examples of lattice structured tasks formulated as DAGs that may be scheduled for execution by multiprocessors in accordance with an embodiment of the present invention.
Figure 7B:
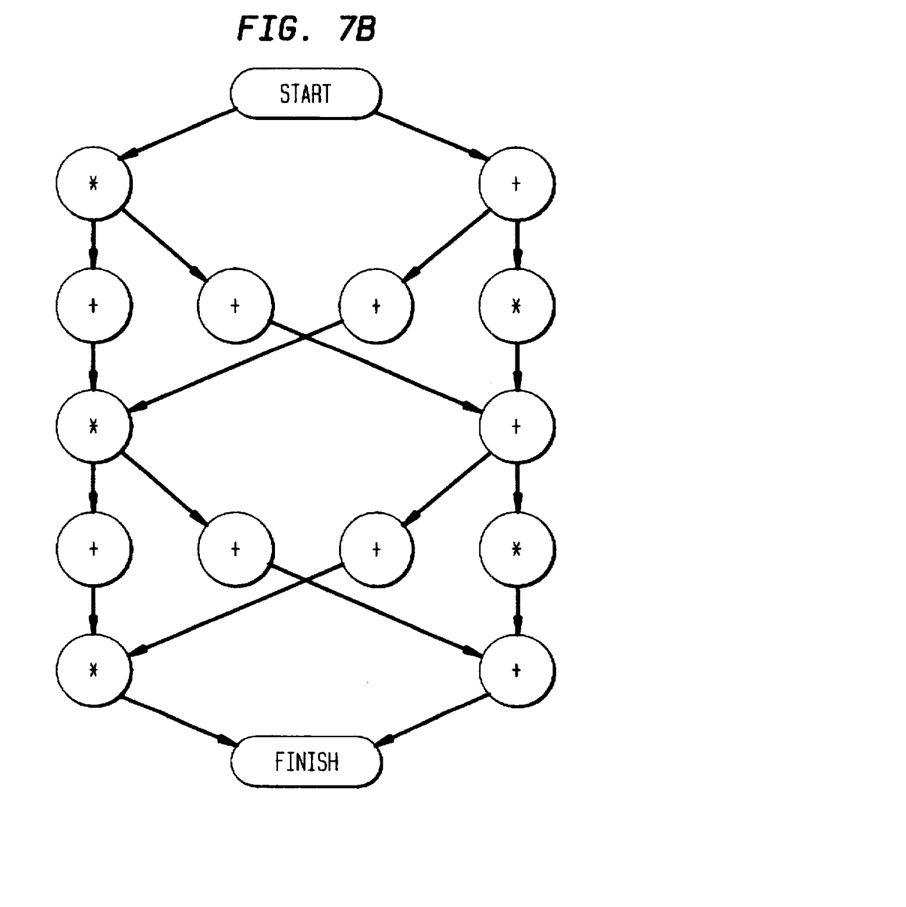

Various DAGs are used for comparative illustration. $DAG_0$ (FIG. 3A) has three matrix multiplies and two additions. All its edges are flow-essential. This provides an example of an embodiment in accordance with the invention on non-trees. $DAG_1$ (FIG. 5A) has a single nonessential edge. $DAG_2$ (FIG. 6A) with 3-outputs, has 3 non-essential edges, 1 - 5, 2 - 5, and 2 - 6. As such, up to 8 combinations of nonessential flows are potential candidates for the processor schedule to be obtained. This DAG provides an example employing node augmentation in accordance with an embodiment of the invention. $DAG_3$ (FIG. 6B) is two copies of $DAG_1$, run in parallel, and has 2 non-essential edges.

All edges of the two lattice structured DAGs are flow-essential. $Latt_2$ is basically two copies of $Latt_1$ run in series. Examples also include lattices which are 3, 4, and 8 copies of Latt, in series. The resulting processor schedule varies widely in magnitude, and deviates from the initial equally distributed flows. The forward edges from one stage to the next have significant processor flows, with the left side being larger than the other. The cross edges, containing only additions, have very small flow.

$Poly_8$ and $Poly_{16}$ (not shown) are matrix polynomials, of degree 8 and 16, commonly encountered in matrix arithmetic. $Poly_8$ has 2 non-flow-essential edges, while $Poly_{16}$ has 10. $Poly_{16}$ provides a complex example of node-augmentation.

Figure 8:
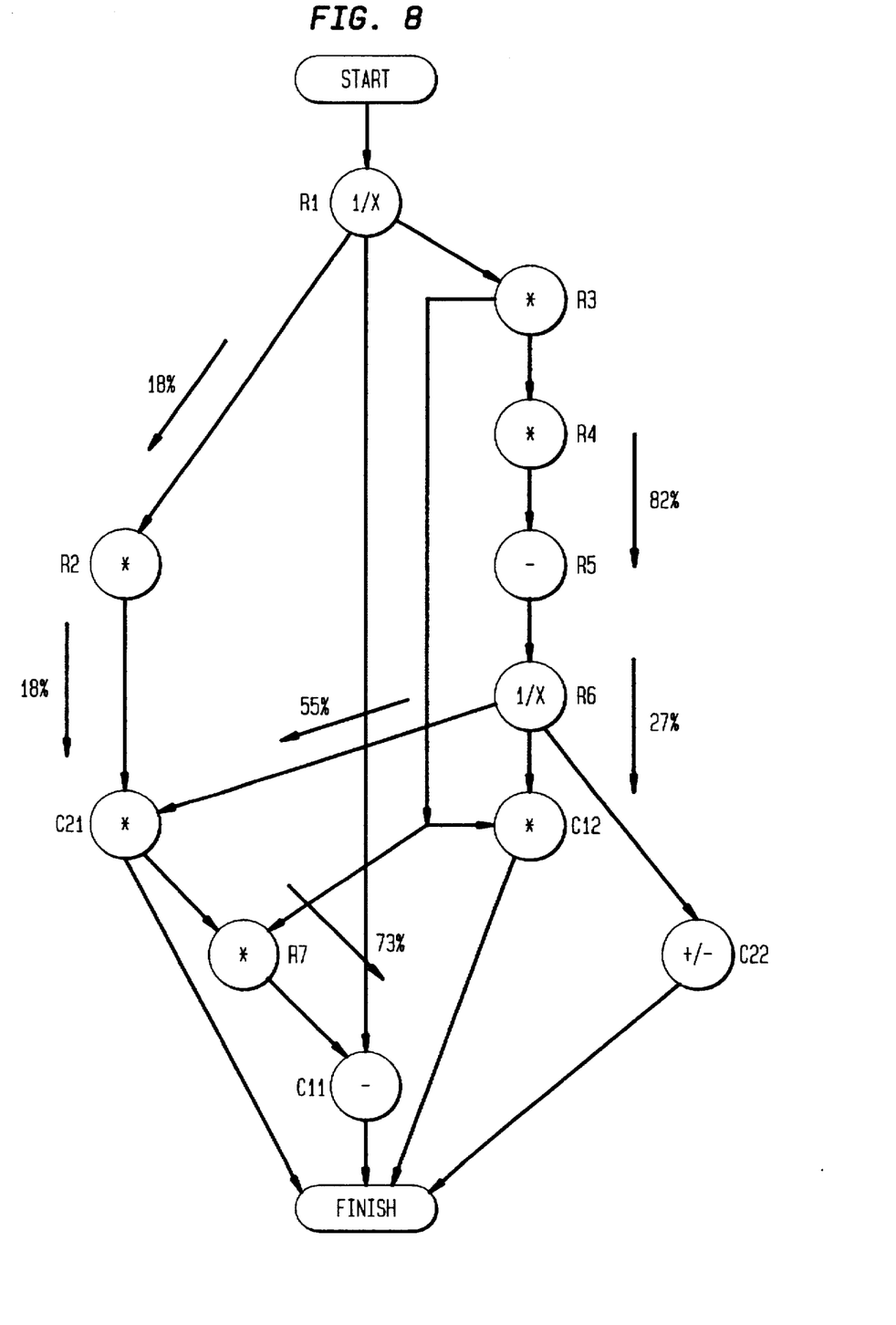
FIG. 8 is an example of a complex task formulated as a Strassen Matrix inverse DAG that may be scheduled for execution by multiprocessors in accordance with an embodiment of the present invention.

FIG. 8 shows a matrix inverse using Strassen's method. Two inverses, six matrix multiplies and two matrix additions are being performed. This graph provides a practical example of an relatively complex unstructured matrix computation, for which the techniques of an embodiment of the present invention are useful. It has both transition and nonessential edges.

The results on each of these examples are tabulated in Table 1. The execution time is tabulated as determined in accordance with the previously described embodiment (scaled by $P^\alpha$), and the total number of iterations (updates of the flow vector). For purposes of comparison, the times as determined by the Naive and Greedy Heuristics are also tabulated. The last two columns (SPN and SPG) show the ratio of these times to the execution times obtained in accordance with the previously described embodiment, and indicate the gains obtained.

| Graph | $T_{EXEC}$ | Iter | $T_N$ | $T_G$ | SPN | SPG |
|---|---|---|---|---|---|---|
| $Dag_0$ | 2.18 | 5 | 3.03 | 2.64 | 1.39 | 1.22 |
| $Dag_1$ | 1.66 | 20 | 2.05 | 2.02 | 1.23 | 1.22 |
| $Dag_2$ | 4.4 | 16 | 6.0 | 4.4 | 1.36 | 1.0 |
| $Dag_3$ | 2.7 | 89 | 4.1 | 3.25 | 1.50 | 1.2 |
| $Poly_8$ | 5.28 | 7 | 7.02 | 5.28 | 1.33 | 1.0 |
| $Poly_{16}$ | 9.68 | 248 | 15.02 | 9.68 | 1.57 | 1.0 |
| Strass | 6.88 | 6 | 8.06 | 7.28 | 1.17 | 1.06 |
| $Latt_1$ | 2.57 | 189 | 3.08 | 3.01 | 1.20 | 1.17 |
| $Latt_2$ | 4.24 | 278 | 5.14 | 5.01 | 1.22 | 1.18 |
| $Latt_3$ | 5.86 | 205 | 7.20 | 7.01 | 1.23 | 1.20 |
| $Latt_4$ | 7.42 | 345 | 9.27 | 9.01 | 1.25 | 1.21 |
| $Latt_8$ | 14.05 | 648 | 17.52 | 17.01 | 1.25 | 1.21 |

The speedups over the Naive method vary from a low of 1.14 to a high of 1.57 (57%), while those over the Greedy vary from 1.0 to 1.22 (22%). The gains exhibited by the previously described examples are substantial and may be even higher for lattice-structured graphs with more parallel paths than $Latt_1$ and $Latt_2$. $Poly_{16}$ and Strassen, illustrate aspects of a method of scheduling and executing multiprocessors in accordance with the invention, and are described below.

$Poly_{16}$ has 10 non-flow-essential edges. The flows vary widely in size, from a low of 0.0015 to a high of 0.6, well over two orders of magnitude. Two edges have a very small flow of 0.0015. The rest have flows at least 20 times higher. This indicates that these two edges are non-flow-essential, illustrating an advantage of node-augmentation.

Strassen's processor schedule shows a gain of 17% over the Naive and a gain of 6% over the Greedy heuristic. The processor flow assigns 82% of the processors to the longer of the two branches R3 - R4 - R5 - R6, and only 18% for the smaller branch R2. R2 and R6 finish at the same time. Most to the processors (55%) computing R6 are transferred to compute C21, R7, and C11. The remaining (27%) compute C12 and C22. This schedule cannot be derived by a Naive or Greedy heuristic.

The number of iterations for all cases is less than 350, except for $Latt_8$, which takes 648 iterations. The resulting execution times in these examples are less than 3 minutes in all cases, except for $Latt_8$, which takes around 12 minutes. However, $Latt_8$ is a very large task graph, with 17 matrix products and 33 additions. The matrix additions are very small in size compared to the matrix multiplications (1.6%). A method of scheduling and executing multiprocessors in accordance with the present invention converges even for this large graph, with very different task sizes.

Although the subject invention has been described with respect to particular embodiments, it will be readily apparent to those having ordinary skill in the art to which it pertains that changes and modifications may be made thereto without departing from the spirit or scope of the subject invention as defined by the appended claims.

What is claimed is:

1. A method of executing signal processing tasks on P processors using a computer to schedule the execution, said method comprising the steps of:

representing the signal processing tasks in a manner stored within said computer so as to determine flow equations and timing constraints for the processor scheduling;

performing corrected gradient descents on the stored representation of the signal processing tasks using said flow equations and determined timing constraints and an error criterion until substantial convergence to a processor schedule occurs; and executing the signal processing tasks on said P processors substantially in accordance with said processor schedule.

2. The method of claim 1, wherein the step of representing the signal processing tasks in a manner stored within said computer comprise removing transitive edges from each of a plurality of edges between a respective first task node and a second task node of a plurality of task nodes of the stored representation of the signal processing tasks.

3. The method of claim 2, wherein the step of representing the signal processing tasks in a manner storm within said computer comprise summing each of said plurality of flows between said plurality of task nodes to determine flow conservation and summing branches in each fundamental loop of a tree formed from said plurality of nodes to determine said flow equations and timing constraints.

4. The method of claim 3, wherein the step of performing corrected gradient descents includes determining an orthonormal basis.

5. The method of claim 3, wherein said tree formed from said plurality of nodes comprises a breadth first spanning tree.

6. The method of claim 1, wherein the step of representing the signal processing tasks in a manner stored within said computer includes augmenting non-essential edges of said signal processing tasks to convert said non-essential edges to essential edges.

7. The method of claim 6, wherein the step of augmenting non-essential edges comprises adding a dummy node to a non-essential edge.

8. The method of claim 1, wherein the step of determining timing constraints includes performing calculations based, at least in part, upon a set of loop equations being based on (E−N+1) loops, where E is the number of edges in said graph, and N is the number of task nodes.

9. The method of claim 1, wherein said signal processing tasks include matrix operations.

10. The method of claim 9, wherein said matrix operations include matrix additions and matrix multiplications.

11. The method of claim 1, wherein said P processors, comprise processors selected from the group consisting essentially of general purpose computers and special purpose signal processors.

12. A system for executing signal processing tasks on P signal processors comprising:

the P signal processors;

a processing scheduler; and a memory system to store a representation of said signal processing tasks in a manner to determine flow equations and timing constraints for said processing scheduler;

said processing scheduler being adapted to schedule the execution of the signal processing tasks on said P signal processors and to perform correcting gradient descents on the stored representations of the signal processing tasks using said determined flow equations and timing constraints until substantial convergence to a processor schedule occurs.

13. The system of claim 12, wherein said processing scheduler is further adapted to augment non-essential edges of said signal processing tasks to essential edges and to remove transitive edges from a flow between a respective first task node and second task node of a plurality of task nodes of the stored representations of the signal processing tasks.

14. The system of claim 13, wherein said processing scheduler is further adapted to augment by adding a dummy node to a non-essential edge.

15. The system of claim 12, wherein said memory system further determines said flow equations and timing constraints by calculating a set of loop equations by summing each branch of a fundamental loop of a tree formed from said plurality of nodes.

16. The system of claim 12, wherein the P signal processors comprise digital signal processors (DSPs).

17. The system of claim 12, wherein the P signal processors comprise microprocessors.

* * * * *